United States Patent

[11] 3,600,933

[72] Inventor James Stewart Johnston
  Bognor Regis, England
[21] Appl. No. 23,377
[22] Filed Mar. 27, 1970
[45] Patented Aug. 24, 1971
[73] Assignee Rosemount Engineering Company Limited
  Bognor Regis, England
[32] Priority Apr. 1, 1969
[33] Great Britain
[31] 17106/69

[54] APPARATUS FOR DETERMINING THE FREEZING POINT OF A SOLUTION
19 Claims, 3 Drawing Figs.

[52] U.S. Cl. .................................................. 73/17 R, 73/67.1
[51] Int. Cl. .................................................. G01n 25/02
[50] Field of Search ...................................... 73/67.1

[56] References Cited
UNITED STATES PATENTS
3,541,540 11/1970 Hughes ........................ 73/67.1
3,341,835 9/1967 Werner et al. ................ 73/67.1

Primary Examiner—Richard C. Queisser
Assistant Examiner—Herbert Goldstein
Attorney—Dugger, Peterson, Johnson & Westman ABSTRACT: Apparatus for determination of the freezing point of a liquid or solution has a probe extending into the liquid which is cooled by a coolant circulated in the probe and with a resistance-type temperature sensor to sense the temperature of the mantle of solid forming on the probe. The probe is mechanically vibrated to prevent supercooling and means are provided for sensing the thickness of the mantle and controlling the coolant circulation to maintain an equilibrium condition with a mantle of constant thickness. The thickness of the mantle may be sensed by measuring an electrical parameter of the solid/liquid material between two electrodes on the probe but preferably it is determined by sensing the change in the mechanical resonant frequency of the probe, the probe being vibrated at its natural resonant frequency.

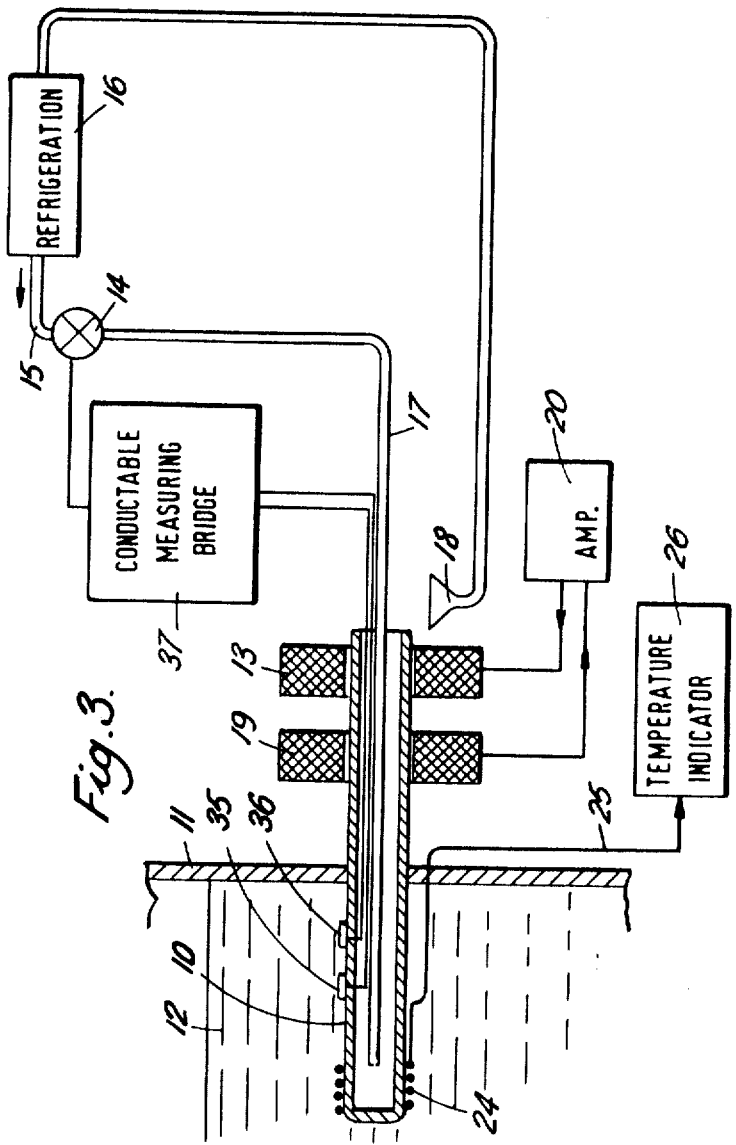

APPARATUS FOR DETERMINING THE FREEZING POINT OF A SOLUTION

BACKGROUND OF THE INVENTION

1. Field of the Invention

This invention relates to apparatus for determining the freezing point of a liquid.

For many chemical processes, the determination of the freezing point of a solution is required both in large scale production plant and in the laboratory. It may be required as a method of determining the concentration of solute or, if the concentration is known, for determining the molecular weight. As another example, in industries concerned with the bottling of gasified liquids it is important to know the freezing point so that bottling can be carried out above this temperature.

Freezing point determination may be used in purity determinations of quite pure organic chemicals. Also pure chemicals of analytical quality are frequently sold with a declared melting point, and in this case, freezing point determination may be desirable for the control of the manufacture.

2. Description of the Prior Art

At present, the most common way of determining melting or freezing point is by the cooling curve technique, that is to say the determination of the relationship between temperature and time as the liquid is gradually cooled. At the freezing point, latent heat is absorbed and there is a plateau in the curve. There is always a danger in this kind of determination that the liquid may be supercooled and, to avoid this, ultrasonic agitation may be employed. However, particularly with a small sample of solution, no flat plateau is in fact observed, because as increasing amounts of solvent freeze, the concentration of the remainder of the solution increases with a consequent decrease in its freezing point. The result is that what would have been a plateau for pure solvent becomes a sloping line having a slope different from that of the liquid above its freezing point. The true freezing point of the solution is, in these circumstances, the temperature at which this change of slope occurs but it is usually difficult to establish this accurately from a graphical record and it is almost impossible to discover the change of slope in the presence of any significant degree of supercool.

SUMMARY OF THE INVENTION

The present invention is directed to an apparatus for determining the freezing point of a liquid without having to plot any graphs.

According to the present invention, apparatus for the determination of the freezing point of a liquid comprises a probe adapted to be at least partially immersed in the liquid, means for vibrating said probe, means for cooling the probe and means responsive to the thickness of solidified material deposited (i.e. solidified solvent in the case of solution) on the probe operative to control the cooling so as to maintain equilibrium conditions with a mantle of solidified material of constant thickness, and means for indicating or recording the temperature of the mantle. When equilibrium conditions are obtained with a mantle of constant thickness, then the heat extracted by the cooling means is just sufficient to maintain the surface of the solid mantle at the freezing point as hereinbefore defined. The vibration of the probe prevents supercooling. The mantle thickness might be determined by a pair of electrodes slightly proud of the probe surface with means for measuring the electrical conductivity between the electrodes or the dielectric constant of or dielectric loss in the medium between the electrodes. For many common solvents, e.g. water, there is a considerable difference between the electrical conductivity and other electrical properties in the liquid and solid state. For other materials there are also considerable differences in the electrical properties in the liquid and solid state.

Most conveniently, however, the mantle thickness is sensed by determining the change in the mechanical resonant frequency of the vibrating probe. Thus the invention, includes within its scope apparatus for the determination of the freezing point of a liquid comprising a probe adapted to be at least partially immersed in the liquid, means for vibrating said probe at its resonant frequency, means for cooling the probe and means responsive to the change in resonant frequency due to solidified material forming on the probe which responsive means are operative to control the cooling to maintain the resonant frequency constant and thereby to maintain equilibrium conditions with a mantle of solidified material of constant thickness, and means for indicating or recording the temperature of the mantle.

The means for indicating or recording the temperature of the mantle may conveniently comprise means to measure the surface temperature of the probe, e.g. a sensor such as a resistance thermometer on the probe. In another arrangement, however, an additional element is provided adjacent the probe whereby, as the solid mantle builds up, it attaches the probe to said additional element, thereby changing the resonant frequency; the means for indicating or recording the temperature of the mantle may then comprise a temperature sensor on or in said additional elements. The true phase equilibrium between the solid and liquid phase occurs at the surface of the solid mantle and the sensor on the additional element senses this temperature. The thickness of the mantle is therefore not of importance. The use of the additional element gives the advantage that there is a marked change of the resonant frequency when the additional element is attached (by the build up of solid material) to the probe. This marked change of resonant frequency enables a larger control signal to be obtained.

Conveniently the probe is hollow and is cooled by circulating a coolant through it. The probe may be a tube extending into the liquid and closed at the end in the liquid; the coolant fluid may be circulated through the probe by means of an open-ended tube extending downwardly into the probe.

It will be seen that an equilibrium condition will be set up in which the heat extracted by the coolant is just sufficient to maintain a constant thickness of the mantle of solidified material. When the system is in equilibrium, the temperature of the probe is the freezing point of the liquid as previously defined, that is to say, in the case of a solution, the point at which the solvent is just beginning to solidify. In the case of a solution, because the system is an equilibrium, the concentration of the solution will remain constant and no difficulties will arise because of any change in freezing point due to changing concentration. The vibration of the probe prevents any possibility of supercooling.

If the probe is a tube, it is preferable that the vibration should be in an axial or torsional mode; with these modes the main surfaces of the probe will exert shearing forces on the liquid rather than compressional forces so that the main effect of the liquid is to damp the resonance rather than to alter the resonant frequency. On the other hand, the solid mantle of solvent will alter the resonant frequency. However in some cases it may be preferred to use other modes of vibration or other forms of probe. For example it may be preferred to use a probe extending completely through a vessel containing the liquid so that the coolant fluid can be passed straight through the probe from one end to the other and in this case a transverse mode of vibration may be more convenient.

The cooling may be effected by passing a coolant, e.g. a suitable gas or liquid, through the tube as previously described. Alternatively the probe may be a rod cooled by a Peltier effect device.

In order to effect vibration of the tube, it may be formed of a piezoelectric material, for example quartz or suitable ceramic and vibrated piezoelectrically by an alternating electric potential applied to electrodes on the probe. In another arrangement, it is formed of magnetostrictive material so that it may be vibrated magnetostrictively. With these arrangements, the probe may be driven by an electronic oscillator. The probe itself is preferably used as the frequency-determining component of the oscillator which may therefore consist of an amplifier amplifying signals from a pickup transducer sensing the vibration of the probe and providing an output to drive the probe. Alternatively the tube may be mechanically coupled to a separate mechanical oscillator.

For determining the change in resonant frequency of the probe, it is convenient to have a reference oscillator which oscillates at a frequency slightly different from the frequency of the probe drive. If signals from the reference oscillator and from the probe drive are mixed, an output is obtained having a frequency, amplitude or polarity which can be used to control the coolant system. It will be appreciated that a probe will have a mechanical resonant frequency which is determining primarily by the mechanical dimensions of the probe and the material thereof. The frequency when immersed in a liquid will differ from the frequency in air but, in practice, a probe unit employed for determination of the freezing point of a solution consisting of a particular solvent and particular solute will have a resonant frequency, when in the solution, which varies only within a limited range and it is readily possible to provide a reference oscillator having a frequency slightly different from that required for driving the probe. In some cases it may be convenient to use, as the reference oscillator, a further probe which is immersed in the solution but is not cooled. By this arrangement, any change in resonant frequency caused by changing properties of the liquid are cancelled.

BRIEF DESCRIPTION OF THE DRAWINGS

FIGS. 2 and 3 are diagrams illustrating modifications of parts of the apparatus of FIG. 1.

DESCRIPTION OF THE PREFERRED EMBODIMENTS

Figure 1:
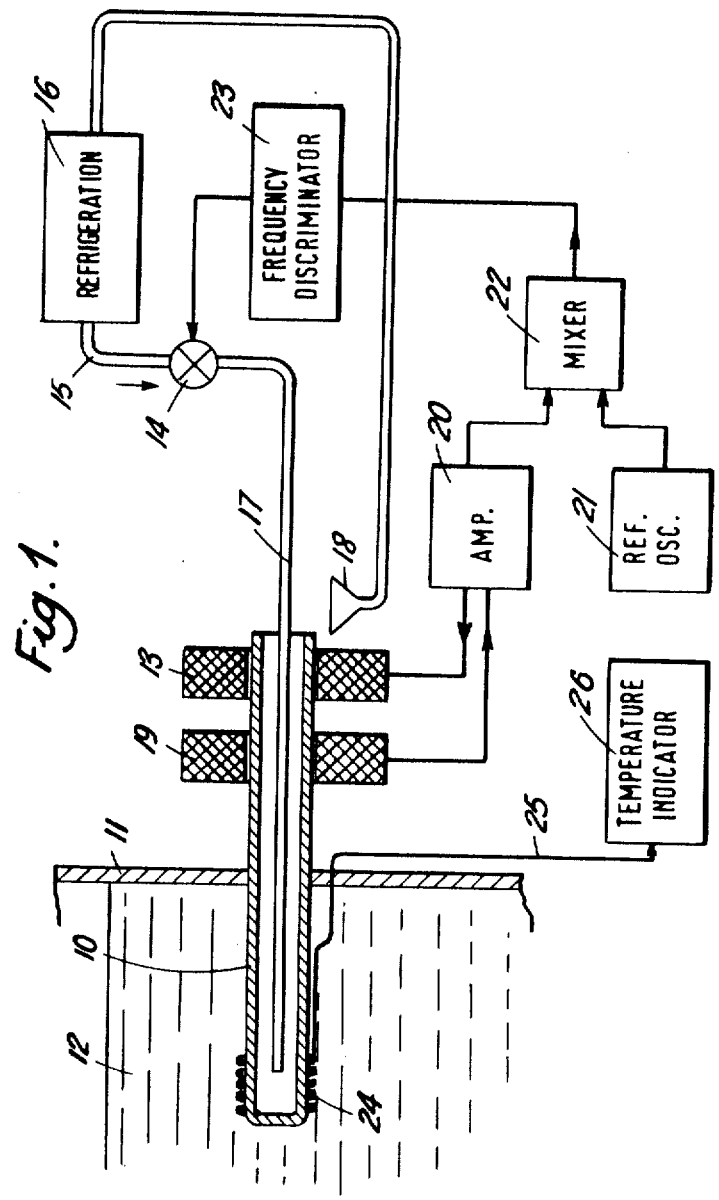
FIG. 1 is a diagram illustrating apparatus for determining the freezing point of a liquid.

Referring to FIG. 1, there is shown a tube 10 formed of a magnetostrictive material, such as nickel or a suitable nickel alloy, which is closed at one end and extends through a wall 11 of a tank into a liquid 12, the closed end of the tube being in the liquid. The tube is maintained in axial or torsional oscillation by a coil 13 energized from an oscillator to be described later. A coolant liquid is circulated through the tube 10, the coolant flow being controlled by a valve 14 between an inlet pipe 15 from a refrigerator 16 or heat exchanger. From the valve 14 the coolant flows into a tube 17 which leads into the tube 10 near the closed end thereof. The coolant flows back through the annular space between the tube 17 and tube 10 and is collected, as indicated diagrammatically at 18 to be recirculated through the refrigerator 16 or heat exchanger. The tube 10 is mounted at the midpoint along its length in the wall 11 of the tank so that there is a node of the axial or torsional oscillation in the plane of the wall 11. The oscillator may be an electronic self-tuned oscillator adjusted to have a frequency corresponding to the resonant frequency of the probe when immersed in the solution but with no coolant being circulated. This adjustment is not critical but the change of frequency of the system due to loading the probe is most sensitive if the frequency is made as near the resonant frequency as possible. Most conveniently the oscillator however uses the probe itself as the frequency determining element, the oscillator thus comprising, as illustrated in FIG. 1, a pickup transducer 19 sensing vibration of the probe, and an amplifier 20 providing a drive output to the probe. The oscillator thus operates at the resonant frequency. A reference oscillator 21 is adjusted to have a slightly lower frequency. This reference oscillator may in some cases conveniently be provided by a second probe and driving circuit similar to 10, 13, 19, 20 but without any cooling system. The outputs from the amplifier 20 and oscillator 21 are fed to a mixer 22 which gives a difference frequency signal which will vary in frequency as the frequency of the amplifier 20 changes. The mixer 22 feeds a frequency discriminator 23 to give an output representative of the frequency difference. This output is used as a control signal controlling the valve 14 to reduce the coolant flow as the frequency difference increases and the system thus comes into equilibrium with just sufficient flow of cooling fluid along the pipe 17 to extract the ambient heat input to the probe 10, leaving the probe covered with a mantle of solidified solvent of constant thickness. The equilibrium thickness of the mantle is determined by the difference between the frequency of the probe without any mantle of solidified material and the frequency of the oscillator 21 as originally set. Once equilibrium has been reached, the probe is at the required freezing point. This is measured by a resistance thermometer consisting of a thin insulated coil of platinum wire 24 wound round and adhesively attached to the outside of tube 10. The resistance thermometer 24 is connected by leads 25 to a temperature indicator 26 or measuring bridge. Alternatively other temperature measuring means, for example a thermocouple might be employed.

The accuracy of temperature measurement can be checked by filling the tank with a liquid having a known freezing point. In many cases distilled water may be suitable. Where solvents other than water are used and it is required to know the depression of freezing point with a particular concentration of solute, a preliminary measurement can be made to establish the freezing point of the pure solvent so that almost all instrumental errors can be eliminated.

Once the system has been set up for a particular solution, it would in general be unnecessary to change the setting of the reference oscillator 21 when one solution sample is changed for another. It is even permissible to have the sample changing continuously, provided the change is at a sufficiently slow rate to ensure that excessive temperature gradients are not built up inside the mantle of solidified solvent which would result in the measured temperature being no longer representative of the surface temperature.

Figure 2:
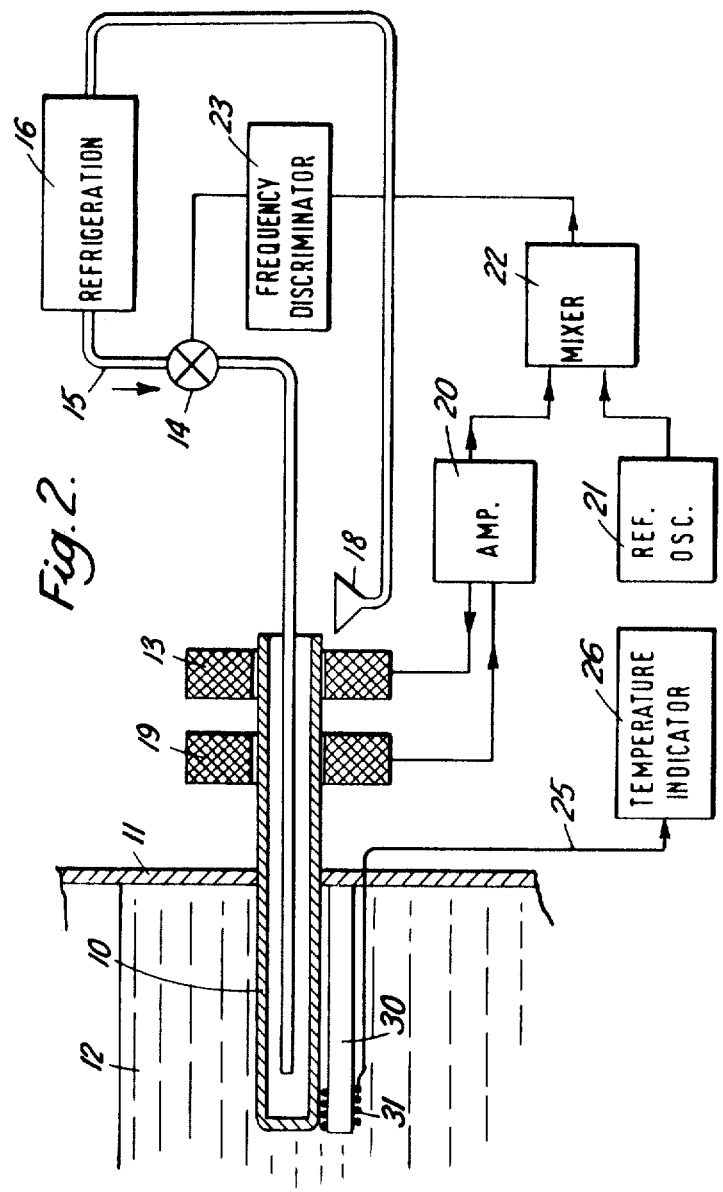

FIG. 2 illustrates a modification of the construction of FIG. 1. The same reference numerals are used for corresponding components and, in the following, mention will only be made of the distinctive features of FIG. 2. Fixed in the tank adjacent the tube 10 is a rod 30. There is a temperature sensor, illustrated as a resistance thermometer element 31, on this rod 30 but no temperature sensor on the probe. With the construction of FIG. 2, as the mantle of solid material builds up, it will eventually come into contact with the rod 30 and adhere thereto. This will cause a marked change in the resonant frequency giving a larger control signal for operating the valve 14 than with the arrangement of FIG. 1. The temperature of the probe might be measured as in the FIG. 1 construction but, by putting the temperature sensor 31 on the rod 30, the temperature at the surface of the solid mantle is sensed. This is the region of true phase equilibrium between the solid and liquid phases and thus the thickness of the mantle is immaterial in the FIG. 2 construction.

FIG. 3 illustrates another modification of the apparatus of FIG. 1. Instead of sensing the change in resonant frequency of the probe, the thickness of the solid mantle is sensed by means of two electrodes 35, 36 on the probe but slightly proud of the surface thereof. Such electrodes may be used to sense the change in dielectric constant or dielectric loss, but, in this particular embodiment, they are connected to a conductivity measuring bridge 37 to measure the change in conductance between the two electrodes. For many liquids, there is a considerable difference between the electrical conductivity in the liquid and solid state. This change in conductance is sensed and used to control the valve 14, so that, as has been described with reference to FIG. 1, the cooling is controlled to maintain a constant mantle thickness.

I claim:

1. Apparatus for the determination of the freezing point of a liquid comprising a probe adapted to be at least partially immersed in the liquid, means for vibrating said probe, means for cooling the probe and means responsive to the thickness of solidified material deposited on the probe for providing an output related to said thickness that operatively controls the cooling means to control the cooling so as to establish equilibrium conditions with a mantle of solidified material of constant thickness, and means for measuring the temperature of the mantle 2. Apparatus as claimed in claim 1 wherein said means responsive to the thickness of the solidified material on the probe comprises a pair of electrodes protruding slightly from the probe surface and means for measuring an electrical parameter of the material between the electrodes.

3. Apparatus as claimed in claim 2 wherein the means for measuring an electrical parameter comprises conductivity-measuring means.

4. Apparatus as claimed in claim 1 wherein said means responsive to the thickness of the solidified material on the probe comprises means responsive to change in the mechanical resonant frequency of the probe.

5. Apparatus as claimed in claim 4 wherein an additional element is provided adjacent the probe whereby, as the solid mantle builds up, it attaches the probe to said additional element, thereby changing the resonant frequency and wherein the means for measuring the temperature of the mantle comprises a temperature sensor on or in said additional element.

6. Apparatus as claimed in claim 1 wherein the means for measuring the temperature of the mantle comprises means to measure the surface temperature of the probe.

7. Apparatus as claimed in claim 1 wherein said probe is hollow and wherein the means for cooling the probe comprise means for circulating a coolant through it.

8. Apparatus as claimed in claim 7 wherein the coolant is circulated through an open-ended inner tube in the probe and back around outside said inner tube.

9. Apparatus as claimed in claim 7 wherein the probe is vibrated in an axial or torsional mode.

10 Apparatus as claimed in claim 1 wherein the probe is an elongate member extending completely through a vessel for containing the liquid and wherein a transverse mode of vibration is employed.

11. Apparatus as claimed in claim 1 wherein the probe is a rod cooled by a Peltier effect device.

12. Apparatus as claimed in claim 1 wherein the probe is formed of a piezoelectric material and wherein the means for vibrating it comprise means for applying an alternating electric potential to electrodes on the probe to vibrate it piezoelectrically.

13. Apparatus as claimed in claim 1 wherein the probe is formed of a magnetostrictive material and is vibrated magnetostrictively.

14. Apparatus as claimed in claim 1 wherein the probe is vibrated by an electronic oscillator using the probe as the frequency-determining component of the oscillator.

15. Apparatus as claimed in claim 14 wherein said oscillator comprises an amplifier amplifying signals from a pickup transducer sensing the vibration of the probe.

16. Apparatus for the determination of the freezing point of a liquid comprising a probe adapted to be at least partially immersed in the liquid, means for vibrating said probe at its resonant frequency, means for cooling the probe and means responsive to the change in resonant frequency due to solidified material forming on the probe, which responsive means provides on output related to said change that operatively controls the cooling means to control the cooling to establish a constant resonant frequency and establish equilibrium conditions with a mantle of solidified material of constant thickness, and means for measuring the temperature of the mantle.

17. Apparatus as claimed in claim 16 and wherein the means responsive to change in resonant frequency comprises a reference oscillator which oscillates at a frequency slightly different from that of the probe, and means producing an output signal by mixing a signal from the reference oscillator with a signal at the probe oscillation frequency obtained from the probe or probe drive.

18. Apparatus as claimed in claim 17 wherein said reference oscillator comprises a further probe to be immersed in the solution but which is not cooled.

19. Apparatus as claimed in claim 18 wherein said probe and said further probe are mechanically similar.